May 9, 1961 C W. MUSSER 2,983,162
STRAIN WAVE GEARING-SPRING PRELOADING
Filed Dec. 10, 1958 5 Sheets-Sheet 1
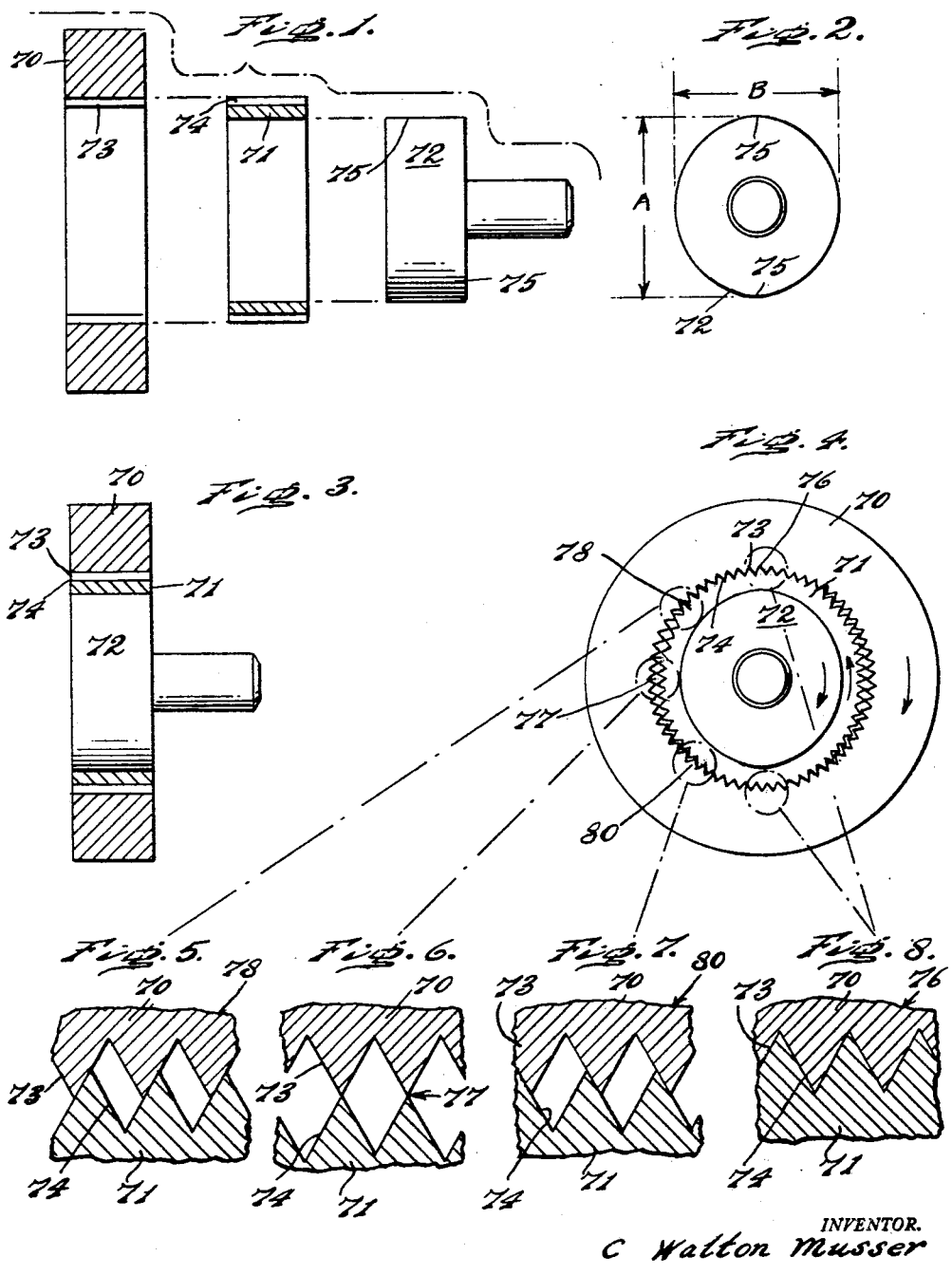
INVENTOR.
C Walton Musser

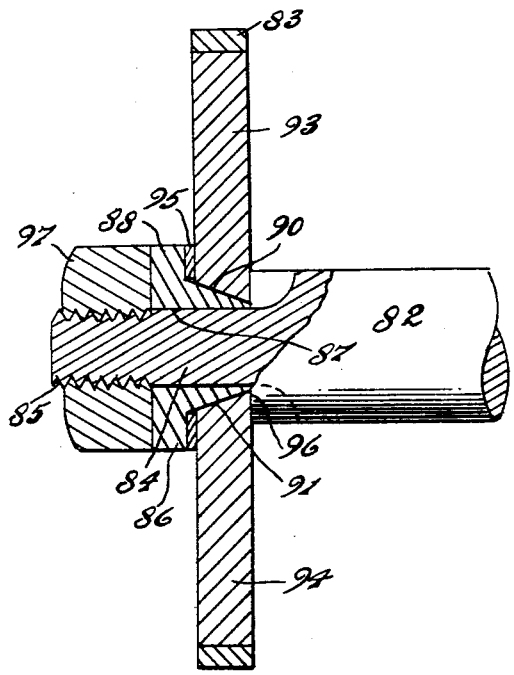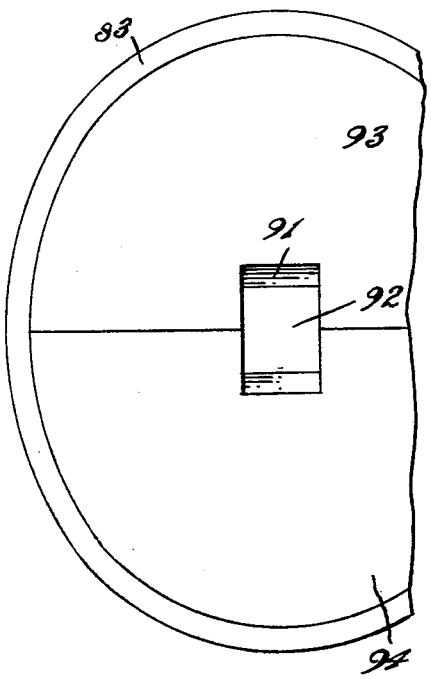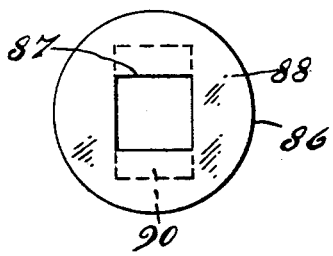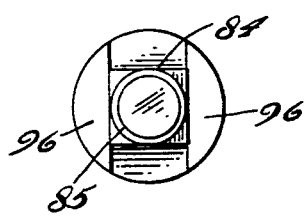
INVENTOR
C Walton Musser
BY
ATTORNEYS.

May 9, 1961   C W. MUSSER   2,983,162
STRAIN WAVE GEARING-SPRING PRELOADING
Filed Dec. 10, 1958   5 Sheets-Sheet 3
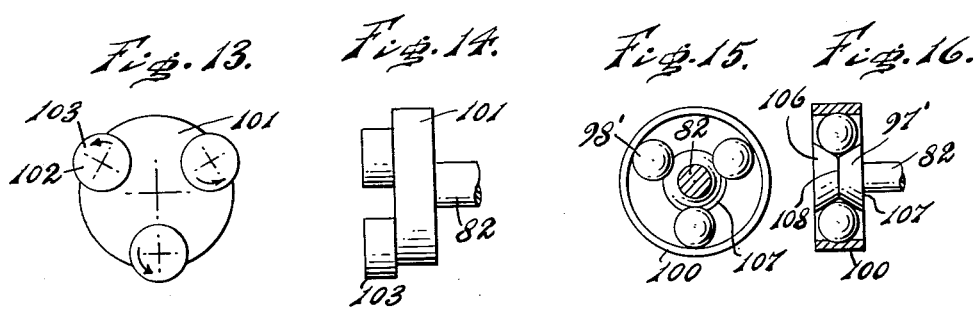
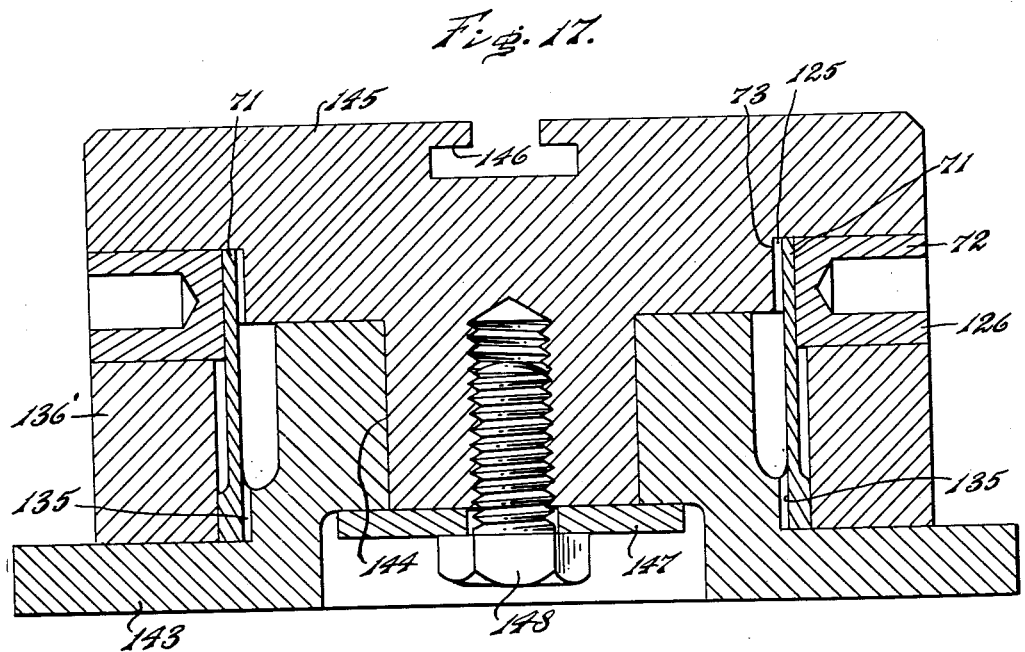
INVENTOR
C Walton Musser
BY
ATTORNEYS.

INVENTOR
C Walton Musser
BY
ATTORNEYS

United States Patent Office 2,983,162
Patented May 9, 1961.

2,983,162
STRAIN WAVE GEARING—SPRING PRELOADING

C Walton Musser, Beverly, Mass., assignor to United Shoe Machinery Corporation, Flemington, N.J., a corporation of New Jersey Filed Dec. 10, 1958, Ser. No. 779,454

3 Claims. (Cl. 74—640)

The present invention relates to motion transmitting mechanism, and particularly to gearing in which relative motion occurs between an internal gear and a cooperating external gear.

The present application is a continuation-in-part relating to the spring preloading species of the subject matter of my parent application Serial No. 495,479, filed March 21, 1955, for Strain Wave Gearing, now U.S. Patent No. 2,906,143, granted September 29, 1959, which is incorporated herein by reference. The reader is referred to my patent aforesaid for explanation of the basic features of the present subject matter.

The species of the parent application relating to the dual form and to the electromagnetic strain-inducer is embodied in my copending application Serial No. 656,572, filed May 2, 1957, for Dual Strain Wave Gearing, and now Patent No. 2,943,513.

This application has been divided and the elliptical bearing subject matter has been embodied in my copending application Serial No. 29,475, filed May 16, 1960, for Elliptical Bearing.

A purpose of the invention is to secure relative motion between cooperating internal and external gears, by propagating a strain wave which advances an area of contact or preferably a plurality of areas of contact between the respective gears.

A further purpose is to obtain freedom from backlash in gearing and desirably also to make the extent of backlash adjustable.

A further purpose is to obtain extremely precise transmission of motion by gearing or similar mechanisms.

A further purpose is to spring preload the wave generator or strain inducer sufficiently to cause elastic deflection of the ring gear.

A further purpose is to spring preload the wave generator or strain inducer sufficiently to cause tooth deflection.

Further purposes appear in the specification and in the claims.

In the drawings I have chosen to illustrate a few only of the numerous embodiments in which my invention may apear, selecting the forms shown from the standpoints of convenience in illustration, satisfactory operation, and clear demonstration of the principles involved.

Figure 1 is an exploded axial section of a device for transmitting motion according to the present invention, in a simplified form.

Figure 2 is a right end elevation of the strain inducer shown in Figure 1.

Figure 3 is an axial section corresponding generally to the exploded section of Figure 1, but showing the parts assembled in their normal operating relationship.

Figure 4 is a right end elevation of the assembly of Figure 3.

Figures 5 to 8 inclusive are enlarged developed fragmentary sections transverse to the axis showing the relative relations of the teeth at various positions in Figure 4, as indicated by the corresponding section lines.

Figures 9 to 12 inclusive illustrate a mechanism which may be employed in producing a suitable strain inducer contour.

Figure 9 is an axial section showing the expansion mechanism in position to expand a ring.

Figure 10 is a detail end elevation of the elliptical expanding segments.

Figure 11 is a detail left end elevation of the washer shown in Figure 9.

Figure 12 is an end elevation of the cam shaft of Figure 9.

Figures 13 and 14 illustrate a still further variant of the mechanical strain inducer, Figure 13 being an end elevation and Figure 14 being a side elevation.

Figures 15 and 16 illustrate respectively in end elevation and axial section a still further form of strain inducer.

Figure 17 is a sectional elevation of a rotary table which is used for circular indexing.

Figure 18:
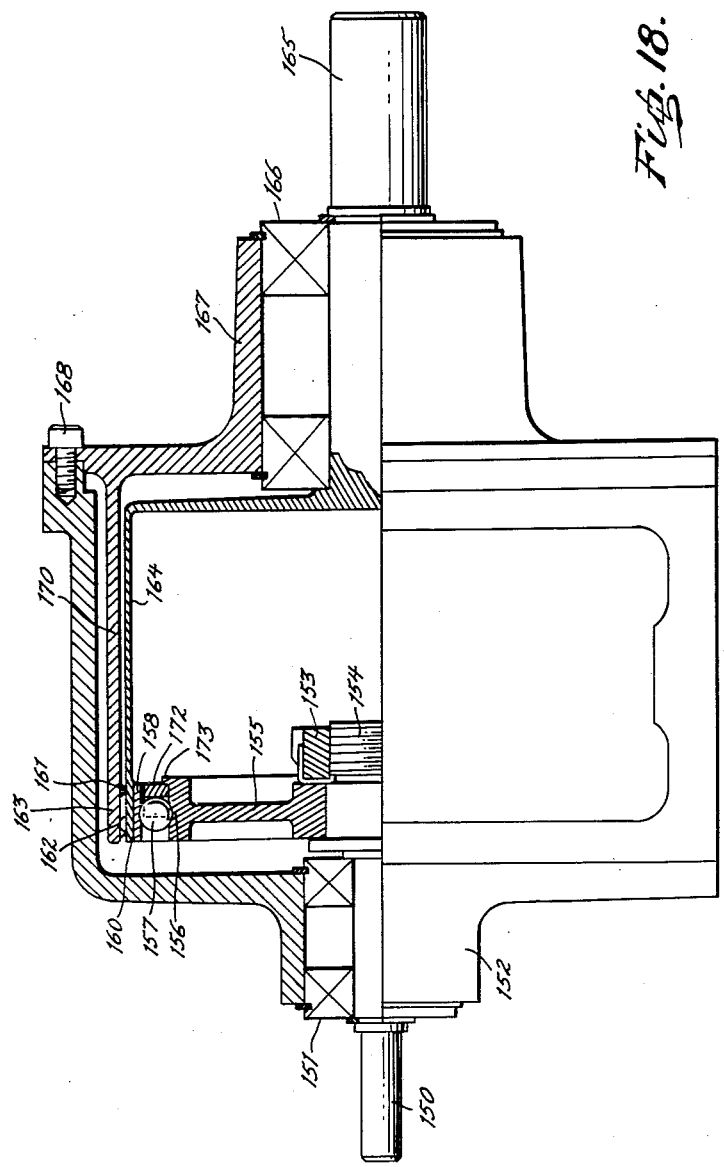

Figure 18 is a side elevation, partially in axial section, showing a modified form of device according to the invention.

Figure 19:
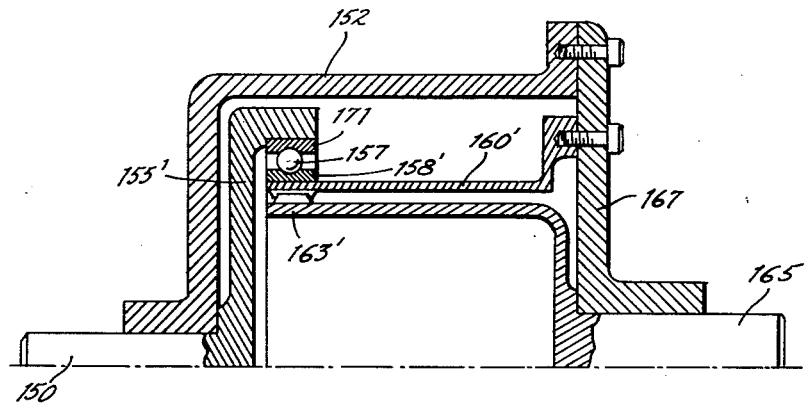

Figure 19 is a half axial section of a modification of the device of Figure 18.

Figure 20:
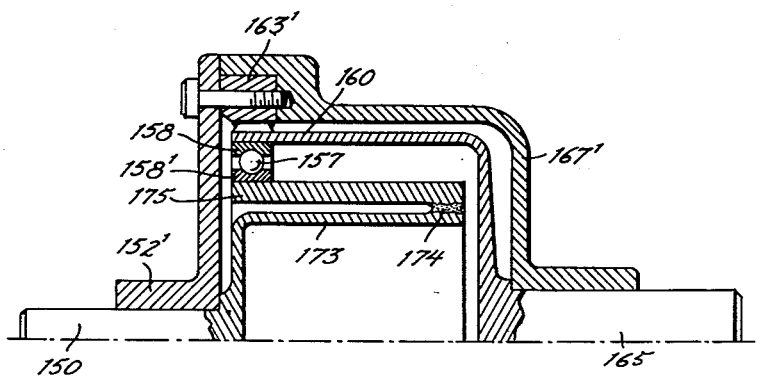

Figure 20 is a half axial section of a still further modification of the device of the invention.

Strain wave gearing is a novel system for transmitting motion and power, in which the gear tooth engagement is induced at a plurality of points by the deflection of a thin ring gear or the like. The tooth engagement at a plurality of points around the circumference is propagated along the periphery of the thin ring gear as the crest of the induced deflection wave is made to move around this periphery. As the deflection moves around the gear, each tooth moves radially in and out of engagement as it progresses from one tooth to the next, tracing during this motion a curve which is generally of the character of a sinusoidal wave, giving rise to the term "strain wave gearing."

In the simplest form as shown for example in Figures 1 to 18 inclusive, the motion transmitting device consists of a ring gear 70, a strain gear 71, and a strain inducer 72. The ring gear has internal teeth 73 in the illustration shown, which are preferably of axially extending character. In this form the strain gear 71 has external teeth 74 which also preferably extend axially and at the same diametral pitch as the teeth on the ring gear but have a slightly smaller pitch diameter. This difference in pitch diameter is caused by the fact that the number of teeth in this case on the strain gear is less than the number of teeth on the ring gear. The difference in the number of teeth between the two gears, or the tooth differential, should be equal to or a multiple of the number of places at which the strain gear is deflected to cause tooth engagement with the ring gear. This differential would desirably be two, using a strain inducer having an elliptical contour with two lobes 75, as shown in Figures 1 and 2. As already explained, the strain gear 71 is made of a material which is elastic under the conditions of operation, and in the case of a steel strain gear, is made of relatively thin cross section so that it can be deflected easily in a radial direction.

The form of strain inducer for transmitting motion as illustrated in Figures 1 to 8 is a very simple one having two points of strain engagement of the strain gear. The strain inducer 72 has an elliptical contour, as already explained, whose major axis A is larger than the inside diameter of the strain gear 71 by an amount approximately equal to the difference in pitch diameter of the ring gear and the strain gear. The minor axis B is smaller than the inside diameter of the strain gear by approximately the same amount. When the strain inducer is inserted into a position inside the strain gear, as shown in Figure 3, it causes the strain gear to be distorted into elliptical form, with the pitch line of the teeth at the major axis equal to the pitch diameter of the ring gear as shown at 76 in Figures 4 and 8. At the position as shown in Figure 8 the pitch circles of the two gears are coincident. At the minor axis the pitch line of the strain gear teeth is smaller than the pitch diameter of the ring gear, and if a full tooth height is used, the teeth will just clear one another as shown at 77 in Figures 4 and 6. At intermediate points 78 and 80 as shown in Figures 4, 5 and 7, the teeth will have varying degrees of engagement. This condition prevails where the tooth differential is equal to the number of lobes on the strain inducer which in this case is two.

Adjustable freedom from backlash

Tooth interengagement in strain wave gearing is the result of the radial deflection of the relatively thin ring strain gear. Engagement is on both sides of the crest of this deflection with the tooth contact area on the strain gear on the side of the tooth toward the crest of the wave. Directly at the crest of the wave, and for approximately 10 percent of the tooth pitch on each side, the teeth are in mesh but not in contact. By making the strain inducer capable of adjusting the deflection, a gear system with backlash can have it removed by increasing the deflection to the point where the crest of the wave is radially deflected further into the mating tooth spaces until the teeth at each side come into contact.

As in standard gearing which has its center distance changed, this partially destroys the theoretical tooth relationship. However, in strain wave gearing this does not appear to have a marked deleterious effect as the angle change from the theoretical parallel mating surfaces is minute. Since the strain gear is a relatively thin gear, by increasing the deflection the crest can be made to "spring load" the contacting piece by changing or skewing the shape of the strain wave. A slight amount of this is desirable to eliminate all backlash and to preload the piece to assure freedom from backlash after high spots on the teeth have been worn away. Increasing the deflection beyond a moderate spring load, however, is not recommended due to the added stresses imposed on the strain gear at the crest of the wave.

It has been experimentally ascertained that a gear system can be easily made free from all backlash without a marked increase in input torque. This was checked on a gear made to the approximate dimensions of the gear described in connection with the calculation of the mechanical efficiency of the system by Formula 17 of the Patent aforesaid, except that the number of lobes was three instead of two. An eight foot long boom was attached to the output shaft and backlash was measured at the end of this boom by a 0.001 inch dial indicator. No backlash was discernable under this test.

Ease of manufacture

Teeth of the size and shape used in strain wave gearing can be broached from tubing in quantity production lots. Since the gears are essentially rings, there is no center hole to which the teeth can be eccentric. Also, as the strain gear is deflected in service, ellipticity or out-of-roundness has no serious effect. Slight variations in tooth contour or dimensions can be compensated for by altering the deflection upon adjustment of the strain inducer. The usual problem of center distance between the gears does not exist in this case, and the balanced forces in the system tend to keep the gears coaxial. In moderately loaded units, a molded neoprene or nylon strain gear can be used.

Basic forms

Strain inducer shaft 82 as shown in Figures 9 to 12 inclusive has a two-lobe strain inducer provided with a ring 83 suitably of low coefficient of friction such as bronze, the ring being capable of being expanded so as to produce the desired amount of elasticity.

The most ideal position is to have all points on the periphery of the expanded arbor just touch and fit inside the fully expanded ring 83. Under these conditions strain wave gearing has the greatest torque capabilities as an applied load cannot skew the strain wave. In practice, supporting it for 60° on each side of the crest on the wave is sufficient. Any suitable form of expanding arbor construction can be used, one example being shown in Figures 9 to 12 inclusive. In this form the shaft 82 has a square end 84 and beyond that has male threads 85. A washer 86 has a squared opening 87 which fits on the squared shaft portion 84, and is provided with a radial flange 88 and opposed wedge faces 90 outwardly directed and respectively engaging with cooperating wedge faces 91 on a square opening 92 formed in arbor segments 93 and 94 which are generally of circular exterior contour, becoming elliptical when the segments separate. The washer is adjusted to any desired position by interposing a shim 95 of the desired adjusted thickness between the arbor segments and the flange of the washer, and the washer flange is tightened to engage the arbor segments with the shoulders 96 on the end of the shaft by means of a nut 97 on thread 85. If it is desired to force the arbor segments out farther and modify the contour of the strain inducer, this can be accomplished by changing the shim thickness and tightening the nut 97. This construction is self-centering, and lends itself to varying degrees of wedge action to modify the strain inducer contour.

For moderate loads and larger diameter strain gears, the three lobe cam follower strain inducer shown in Figures 13 and 14 can be used. The shaft 82 mounts a planet mounting 101 thereon. The planet mounting has at equal circumferential positions as shown eccentric pins 102 each positioned at the same radial position, each on an axis parallel to the axis of shaft 82 and each carrying rotatable about the pins, but eccentric to their axes, standard ball-bearings 103 which act as cam followers. Thus by setting the positions of the eccentric pins and locking them in the proper positions, the radial action of the cam followers can be adjusted. It will be evident that all of the cam followers will be adjusted to the same radial position and will be equally circumferentially spaced. It will also be evident that since the cam followers are capable of adjustment as desired, they can be employed not only to apply the strain wave but also to spring preload the strain gear for the purpose of eliminating backlash as already explained. The cam followers should be as large in diameter as possible to give the maximum obtainable support to the crest of the wave. This system does not have the same rigidity and does not have the same load carrying capability as the supported plain strain inducer or ball-bearing systems. Since the gear teeth that are carrying the load are not at the crest of the wave, a heavy load will tend to distort or skew the wave form when the strain gear is not supported at the side of the wave. This skewing will shift the load toward the teeth that are supported at the crest. For shock resistance this is an advantage as the strain gear has an increasing spring gradient to resist any load tending to distort it. While it is highly shock absorbent and resistant, it should not be operated under heavy load as this tends to produce additional stress in the strain gear.

The three lobed strain inducer illustrated in Figures 15 and 16 drives by this planetary means and consequently the over-all gear ratio is from 2.5 to 10 times as great as the ratio of the strain wave gear in which it is used. In this form the inner race 97' is separated into two axially separate units 106 and 107, mounted on the shaft 82, and adjustable to increase or reduce the effective diameter of the external groove by inserting or removing shims at 108 between the race portions, and then clamping the race portions against the shims. Anti-friction bearing elements such as balls 98' move in the internal race and in the groove of a thin outer race 100. Adjustment of the deflection is accomplished as just explained by axial adjustment of the parts of the split inner race with respect to one another. This form is very simple and satisfactory for moderate loads. Its efficiency is probably the highest of any form as the rolling friction is reduced to a low level by the absence of a ball retainer and the small number of large diameter balls or other anti-friction elements involved. No retainer for the balls is required if the deflection has been adjusted so that there is a minimum of backlash.

Figure 17 illustrates one of many possible examples of inverted strain wave gearing, and it will be understood that these same principles can be applied to invert any one of the other forms. The particular example illustrates a rotary table, work support, or machine support, which is used for circular indexing. The drawing shows a base 143 which has a bearing 144 providing a rotational mount for a table 145 provided with the usual work attaching T-slot means 146. The strain gear 71 is splined at the opposite end at 135 to engage with cooperating splines on the base 143, and is held in place by ring 136' which makes a force fit around the strain gear. The strain gear internally engages external teeth on the inverted so-called ring gear 73 provided on the outside of the rotary table 145. A plain bearing strain inducer is conveniently used in this form as it is desirable to take advantage of the frictional engagement to make the table self-locking. When the strain inducer 72 is circular on the outside diameter, it is machined on the inside with a slight eccentricity so as to produce the desired strain wave in the strain gear. The interior is purposely machined to produce a slightly excessive deflection so that it will positively assure complete absence of backlash by spring loading the strain gear. This will cause a slight unobjectionable distortion in the strain inducer ring when it is assembled. Since all the parts are inverted, the teeth on the strain gear are on the inside and the mating teeth on the table are external as just explained. The strain inducer is suitably provided with index marks and these are read to a reference line on the forced fit ring 136'. With this design the ratio between the strain inducer and the table can be made in the range from about 90 to 1 to 360 to 1. With 360 to 1 as the ratio and an 8 inch table the index marks for ten second graduations are more than 1/16 inch apart, thus assuring an extremely precise adjustment. The rotary table has extreme rigidity and zero backlash so that machine operations can be performed in the various positions or settings of the table without the necessity to provide external locking devices. It will, however, be understood that external locking can be employed if desired. In order to further assure a relatively tight fit, the table is held down on the base by a washer 147 secured by a bolt 148, and the washer will desirably be a Belleville washer or Belleville spring to provide preload of the bearing in the axial direction.

In Figure 18 I illustrate a speed changer according to the invention which has an input shaft 150 journalled at 151 in a housing portion 152 and carrying locked on the shaft by nut 153 engaged with threads 154, a wave generator or strain inducer 155 which is desirably the inner race of a ball bearing, the exterior contour of the race as viewed from the end being elliptoidal at the surface 156 as later explained. The race 155 receives bearing balls 157 of uniform diameter which engage within an outer race 158 which is deflectable and is secured on the inside of a wave carrier or strain gear 160 having exterior teeth 161 meshing with interior teeth 162 on an internal ring gear 163. The wave carrier 160 is connected by a deflectable wall 164 with output shaft 165 which is journalled in bearings 166 in a housing portion 167 which is connected to the housing portion 152 by bolts 168.

The ring gear though relatively rigid, is slightly deflectable and is anchored by an elongated sleeve portion 170 with the housing portion 167.

All of the components described may suitably be of steel, stainless steel or the like. The wave generator or strain inducer 155 in this case elliptoidally deflects the wave carrier or strain inducer 160 within the elastic limit, but by reason of the fact that the elliptoidality is excessive with respect to the space available for the wave carrier or strain gear 160, the ring gear 163 itself is deflected to make it slightly elliptoidal, thus assuring extra protection against backlash and extra firmness of locking, and wider area of tooth engagement between the ring gear and the strain gear.

In operation of the form of Figure 18, as the input shaft 150 turns, it turns the wave generator or strain inducer 155 and through the balls 157 and the race 158 (suitably of uniform diameter) it elasticly deflects the wave carrier or strain gear 160 into engagement at the spaced points, with respect to the teeth on the ring gear 163 and further slightly elasticly deflects the ring gear 163, broadening the zones of contact but leaving intermediate teeth out of contact. The motion of the input causes relative rotation of the output 165.

In Figure 18 the wave generator is internal and in Figure 19 there is a reversal, with the wave generator external but the components otherwise the same. Thus, in Figure 19, the wave generator or strain inducer 155' is externally acting on the outside of a deflectable ball-bearing race 171 of uniform thickness circumferentially, which engages the balls 157 of uniform diameter, which on the inside are retained in a race 158' which is deflectable and of uniform thickness around the circumference, and which bears on the outside of a wave carrier or strain gear 160' which has internal teeth meshing at spaced points around the circumference with external teeth on a ring gear 163', the ring gear being slightly deflected into an elliptoidal shape in end view by extra deflection imparted by the wave generator.

In the form of Figure 18 a bearing retainer 172 has been included resting against a flange 173 on the wave generator, but this feature is omitted in Figure 19.

In Figure 20 the input shaft 150 mounts a somewhat resilient cup 173 which is coaxial with the shaft and is secured as by welding at 174 to an elliptoidal wave generator or strain inducer 175 which extends from the annular weld 174 to a position adjoining the base of the cup 173, and an inner bearing race 158' of circumferentially uniform thickness is deflected into an elliptoidal shape by the wave generator 175 and engages the insides of uniform diameter ball-bearing balls 157 which are retained at the outside by a circumferentially uniformly thick race 158 which rests against the inside of wave carrier or strain gear 160 which has external teeth meshing at circumferentially spaced points with internal teeth on a rigid ring gear 163' which is held between parts 152' and 167' of the housing.

In this form the ring gear is so rigid that the tendency of the wave generator to deflect the wave carrier or strain gear beyond the distance permitted by the dimensions when the teeth on the wave carrier or strain gear engage the teeth on the ring gear, results instead in tooth deflection and slight elastic deflection of the wave generator 175.

It will accordingly be evident that by control of the relative stiffness the extent of additional pressure of engagement of the teeth at the points of engagement with intermediate areas of nonengagement can be controlled.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a device for transmitting motion, a first gear, a second gear of different diameter from the first gear having teeth of the same size as the first gear, coaxial with the first gear and having a deflectable wall, a strain inducing element operatively deflecting the second gear and maintaining the second gear deflected so that its teeth are in contact with the teeth of the first gear at a plurality of circumferentially spaced positions interspaced by non-mating positions, said strain inducing element further being operative to deflect the teeth of the respective gears until the contact of the teeth is without backlash, and means for moving the operative relation of the second gear to the first gear and thereby propagating a strain wave around the periphery of the second gear and causing relative rotation of the second gear with respect to the first gear without backlash between the gears.

2. A device of claim 1, in which the strain inducing element deflects the gears to force the gear teeth into intermittent engagement with each other and hold them together by a spring preload.

3. In a device for transmitting motion, a first element having teeth, a second element of different diameter from the first having teeth adapted to engage those on the first element, coaxial with the first element and having a deflectable wall, a strain inducing element operatively deflecting the second element and maintaining the second element deflected so that its teeth are in contact with the teeth of the first element at a plurality of circumferentially spaced positions interspaced by non-mating positions, said strain inducing element further being operative to deflect the teeth of the respective first and second elements until the contact of the teeth is without backlash, and means for moving the operative relation of the second element to the first element and thereby propagating a strain wave around the periphery of the second element and causing relative motion of the second element with respect to the first element without backlash.

References Cited in the file of this patent

UNITED STATES PATENTS

| | | |
|---|---|---|
| 2,534,929 | Schultz et al. | Dec. 19, 1950 |
| 2,609,256 | Baker et al. | Sept. 2, 1952 |
| 2,672,766 | Dunkelberger | Mar. 23, 1954 |
| 2,682,179 | Freeman | June 29, 1954 |